United States Patent
Moyse et al.

(10) Patent No.: US 7,504,815 B2
(45) Date of Patent: Mar. 17, 2009

(54) SWITCH MODE POWER SUPPLY CONTROL SYSTEMS

(75) Inventors: Philip John Moyse, Carlton (GB); David Robert Coulson, Watford (GB); Russell Jacques, Withersfield (GB); David M. Garner, London (GB)

(73) Assignee: Cambridge Semiconductor Limited, Cambridge, Cambridgeshire (GB)

( * ) Notice: Subject to any disclaimer, the term of this patent is extended or adjusted under 35 U.S.C. 154(b) by 174 days.

(21) Appl. No.: 11/481,485

(22) Filed: Jul. 6, 2006

(65) Prior Publication Data

US 2007/0041224 A1    Feb. 22, 2007

Related U.S. Application Data

(60) Provisional application No. 60/698,808, filed on Jul. 12, 2005.

(30) Foreign Application Priority Data

Jul. 6, 2005    (GB) ................... 0513772.4

(51) Int. Cl.
*G05B 24/02*    (2006.01)
*G05F 1/00*    (2006.01)

(52) U.S. Cl. .................... 323/351; 323/282; 323/283; 323/284

(58) Field of Classification Search ......... 323/282–284, 323/351
See application file for complete search history.

(56) References Cited

U.S. PATENT DOCUMENTS

| | | |
|---|---|---|
| 4,109,194 A | 8/1978 | Miller |
| 4,356,542 A | 10/1982 | Bruckner et al. |
| 4,994,955 A | 2/1991 | Schoofs et al. |
| 5,068,571 A | 11/1991 | Schoofs |
| 5,274,274 A | 12/1993 | Leman et al. |
| 5,479,090 A | 12/1995 | Schultz |

(Continued)

FOREIGN PATENT DOCUMENTS

DE    195 15 210 A1    10/1996

(Continued)

OTHER PUBLICATIONS

Matsuo, H., et al., "Novel digital controller for the PWM and/or PFM controlled switching DC-DC converters," Telecommunications Energy Conference, 1998, Intelec. 20th Int'l, San Francisco, CA, pp. 225-230.

(Continued)

*Primary Examiner*—Jessica Han
*Assistant Examiner*—Emily Pham
(74) *Attorney, Agent, or Firm*—Knobbe, Martens, Olson & Bear LLP

(57) ABSTRACT

We describe a switch mode power supply (SMPS) controller employing a combination of pulse frequency and pulse width modulation. The controller employs a "gear box" control scheme using two complementary control loops, one for real-time control of the SMPS using PFM and a second using a PWM control scheme which monitors the switching frequency and, at defined operating points, adjusts the pulse width up or down through a set of pre-determined values. This can be considered analogous to the gearbox of a motor vehicle with the SMPS pulse width, switching frequency and output power roughly corresponding to the vehicle's gear ratio, engine speed and road speed respectively.

23 Claims, 6 Drawing Sheets

U.S. PATENT DOCUMENTS

| | | | |
|---|---|---|---|
| 5,568,044 | A | 10/1996 | Bittner |
| 5,631,494 | A | 5/1997 | Sakurai et al. |
| 5,631,550 | A | 5/1997 | Castro et al. |
| 5,656,968 | A | 8/1997 | Sander et al. |
| 5,737,169 | A | 4/1998 | Sellers |
| 5,757,625 | A | 5/1998 | Schoofs |
| 5,892,672 | A | 4/1999 | Preller |
| 5,936,852 | A | 8/1999 | Weinmeier et al. |
| 6,005,377 | A | 12/1999 | Chen et al. |
| 6,137,696 | A | 10/2000 | Hall et al. |
| 6,275,018 | B1 | 8/2001 | Telefus et al. |
| 6,304,473 | B1 | 10/2001 | Telefus et al. |
| RE37,609 | E | 3/2002 | Bittner |
| 6,396,718 | B1 | 5/2002 | Ng et al. |
| 6,703,684 | B2 | 3/2004 | Udrea et al. |
| 6,781,422 | B1 | 8/2004 | Yang |
| 6,781,423 | B1 | 8/2004 | Knoedgen |
| 6,862,198 | B2 * | 3/2005 | Muegge et al. ........... 363/21.11 |
| 6,897,492 | B2 | 5/2005 | Ochi |
| 7,049,870 | B2 * | 5/2006 | Brown et al. ................ 327/172 |
| 7,061,213 | B2 * | 6/2006 | Yoshida ...................... 323/224 |
| 2002/0057080 | A1 | 5/2002 | Telefus et al. |
| 2002/0097008 | A1 | 7/2002 | Krummel |
| 2004/0037094 | A1 | 2/2004 | Muegge et al. |
| 2004/0174722 | A1 | 9/2004 | Kunii |
| 2004/0227539 | A1 | 11/2004 | Thiery |
| 2005/0052249 | A1 | 3/2005 | Gan et al. |
| 2005/0151571 | A1 | 7/2005 | Brown |
| 2005/0270008 | A1 | 12/2005 | Kuo |

FOREIGN PATENT DOCUMENTS

| | | |
|---|---|---|
| EP | 0093902 A1 | 11/1983 |
| EP | 0 287 109 A2 | 10/1988 |
| EP | 0 516 848 A1 | 12/1992 |
| EP | 0 874 446 A | 10/1998 |
| EP | 0 993 105 A1 | 4/2000 |
| EP | 1 087 508 A1 | 3/2001 |
| EP | 1 213 822 A1 | 6/2002 |
| JP | 2004/236461 | 8/2004 |
| WO | WO 03/050637 A2 | 6/2003 |
| WO | WO 03/055072 A1 | 7/2003 |
| WO | WO 2006/067522 A3 | 6/2006 |
| WO | WO 2006/067523 A3 | 6/2006 |

OTHER PUBLICATIONS

International Search Report for PCT/GB2006/050190, mailed on Oct. 17, 2007.

* cited by examiner

SWITCH MODE POWER SUPPLY CONTROL SYSTEMS

CROSS-REFERENCE TO RELATED APPLICATIONS

This application claims the benefit of U.S. Provisional Application No. 60/698,808, filed Jul. 12, 2005, which is hereby incorporated by reference. This application also claims the benefit of United Kingdom Patent Application No. GB0513772.4, filed Jul. 6, 2005, which is hereby incorporated by reference.

BACKGROUND OF THE INVENTION

1. Field of the Invention

This invention generally relates to control systems for switch mode power supplies (SMPS), in particular digital control schemes.

2. Description of the Related Art

We have previously described in UK Patent Applications 0427893.3 and 0427894.1 both filed on 21 Dec. 2004, some improved control techniques for digital SMPS controllers.

Background prior art relating to PWM and PFM controllers can be found in US 2004/0037094 and in the datasheet on the Power Integrations (RTM) TOP242-250 TopSwitch GX family (®) datasheet. These latter devices typically run at a fixed frequency for medium to heavy loads, employing PWM as the control method, but switching to a lower frequency for light loads. It is also known to deploy a cycle skipping scheme where power cycles are skipped when an SMPS output voltage is above its target value (see, for example, the datasheet on the power integration (®), "TinySwitch" products TNY253/254/255).

Further background prior art can be found in US 2002/0057080, U.S. Pat. Nos. 6,275,018, 6,304,473, EP 0 874 446A, U.S. Pat. Nos. 5,757,625, 5,479,090.

SUMMARY OF THE INVENTION

Certain embodiments provide a switch mode power supply controller employing a combination of pulse frequency modulation and pulse width modulation to control a power switching device, the controller having: an input to receive an output voltage dependent feedback signal; an output for driving said power switching device; and a controller to provide a switching control signal to said output responsive to said feedback signal from said input, said switching control signal having a switching cycle including an ON portion for switching on said power switching device, and wherein said controller is configured to select one of a plurality of discrete pulse widths for said ON portion of said switching cycle using at least one stored pulse width, and to vary a duration of said switching cycle responsive to said feedback signal.

The discrete pulse widths may either be stored in a hardwired configuration of the controller hardware, or they may be stored as data in a look-up table (optionally non-volatile), or the pulse widths may be stored in the controller by providing a number of pulse generators each configured to provide a pulse of a different fixed or pre-determined width.

Alternatively the at least one stored pulse width may include at least a maximum pulse width and then the other discrete pulse widths may be determined from this, for example by interpolation between this maximum pulse width value and a minimum pulse width value (which may be zero). Preferably in such embodiments the controller is configured to select one of a plurality of discrete pulse widths (defining a set of available pulse widths) for the ON portion of said switching cycle using stored maximum and minimum pulse width values. Thus the controller may increment/decrement between discrete pulse width values according to the output voltage-dependent feedback signal or, in more general terms, demand. Embodiments of this type of arrangement can be implemented using less silicon area than a look-up table.

The discrete pulse widths operate in a manner akin to gear ratios of a gearbox. In some cases, for example in a lookup table-based embodiment, only a few gears may be provided, for example, less than 20, 10 or 5. In other cases, the discrete pulse width values may be closely spaced and many values may be available. To continue the gearbox analogy, such embodiments are more closely akin to a continuously variable transmission. Changing up or down a gear—that is, incrementing or decrementing between discrete pulse widths—may comprise incrementing/decrementing by a fixed or pre-determined number such as a digital integer, or by a fixed fraction. Optionally the pulse duration/frequency may be correspondingly adjusted by a complementary increment (or decrement), for example between pre-determined maximum and minimum values. Preferably one or both of a maximum and minimum pulse width is stored. It will be appreciated that, in embodiments, user-accessible registers may be provided to store one or more of these maximum and/or minimum values—for example the maximum and/or minimum pulse width values may be user write-accessible; in other embodiments these values may be hardcoded.

In embodiments the power device switching control signal defines an ON portion of the power device switching cycle followed by an OFF portion of the switching cycle, the ON portion of the cycle being defined by one of the plurality of discrete or stored pulse widths, the end of the OFF portion of the cycle (and restart of the subsequent ON portion) being defined by the feedback signal. The feedback signal provides information on the SMPS output (power device switching information, optionally cycle-by-cycle), preferably as a variable level signal which is compared with a reference level (for example by means of a voltage reference and comparator) to determine a timing of the end of the OFF portion/switching cycle restart.

The skilled person will recognise that embodiments of the above described SMPS controller may be employed in a wide range of SMPS configurations including (but not limited to) a flyback converter, a direct-coupled boost converter, and a direct-coupled buck converter. Where the SMPS includes a transformer driven by the power switching device the feedback signal may be derived from the secondary side of the transformer (as described in preferred embodiments later), or from the primary side of the transformer, or from an auxiliary winding of the transformer. In SMPS arrangements with an inductor in place of a transformer the feedback signal may similarly be derived from the primary-side, from the secondary-side or from an auxiliary winding of the inductor.

In preferred embodiments the controller is configured to determine (measure) the switching cycle duration, which is controlled by the feedback signal, for example by resetting a counter at the start of the switching cycle and determining the count when the feedback signal indicates that the switching cycle should be restarted. Conveniently, therefore, the controller includes a system clock to clock this counter, and the discrete or stored pulse widths may then also be defined in terms of the number of cycles of this system clock. A discrete or stored pulse width may then be selected responsive to the determined duration of each power switching cycle, giving cycle-by-cycle control.

Preferably the controller has a plurality of operating power ranges, each of which may be defined by a combination of a discrete or stored pulse width and a range of switching cycle durations between, say, lower and upper frequency limits (which in the case of the minimum pulse width may comprise a lower frequency limit of substantially zero). Each of these operating power ranges preferably defines, for the controlled SMPS, an average power transferred per switching cycle by the SMPS power switching device. Preferably the operating power ranges are defined (by the pulse width/frequency combinations) so that they overlap, thus providing a degree of hysteresis which helps to inhibit hunting between different power ranges.

To select a power range the controller is preferably configured to select an increased pulse width responsive to the determined switching cycle duration being less than a lower threshold and a decreased pulse width responsive to the determined duration being greater than an upper threshold. In other words, broadly speaking, as the switching frequency reduces the power supply changes down a gear, and as the frequency increases the power supply changes up a gear. The switching frequency, it will be recalled, is in preferred embodiments responsive to the output load, more particularly the output voltage so that the selected "gear" (pulse width) is in this way dependent upon the output load. The upper and lower thresholds may be defined in terms of duration or frequency and are preferably stored in the controller, for example in a further look-up table or in one or more registers; optionally different upper and/or lower thresholds may be employed for different selected pulse width values.

Embodiments of the above described system also enable a minimum operating frequency to be defined for most circumstances (except where the pulse width as a minimum of its selectable, pre-determined values). Preferably this minimum operating (switching cycle) frequency is outside a normal human audio range, for example greater than 5 KHz, 10 KHz, 15 KHz, or preferably 20 KHz. Preferably this frequency is predetermined and, for example, stored in the controller.

Preferably the controller includes a data store such as one or more registers to store values of one or more of n, m, and p where n defines the duration of a switching cycle, and m defines a number of stored pulse widths for selection, and p defines a minimum duration of a pulse width. Optically an additional parameter q is defined determining the maximum pulse width. Preferably these parameters are defined in terms of the number of counted system clock pulses. In embodiments the m pulse widths vary from a minimum ON time of p system clock cycles to a maximum of q (or n/2) system clock cycles, the total switching period being at least n system clock cycles. In preferred embodiments a timing signal or signals (FBD) is derived from the feedback signal which changes (transitions) to indicate when the output (voltage) level falls below a threshold value and to initiate a power switching cycle. Where these transitions are close together (a short FBD pulse) defining a minimum duration of n counted system clock pulses defines a maximum duty cycle for the power device switching control signal, for example in embodiments of 50 percent.

Certain embodiments provide a method of operating a switch mode power supply controller employing a combination of pulse frequency modulation and pulse width modulation to control a power switching device, the controller having: an input to receive an output voltage dependent feedback signal; an output for driving said power switching device; and a controller to provide a switching control signal to said output responsive to said feedback signal from said input, said switching control signal having a switching cycle including an ON portion for switching on said power switching device, the method comprising: selecting one of a plurality of discrete pulse widths for said ON portion of said switching cycle using at least one stored pulse width; and varying a duration of said switching cycle responsive to said feedback signal to regulate an output of said switch mode power supply.

Certain embodiments provide processor control code, in particular on a carrier medium, for implementing this method. The carrier medium may comprise a disk, programmed memory or a data carrier such as an optical or an electrical signal carrier. The code may comprise conventional computer program code and/or code for setting up or controlling an ASIC or FPGA, or code for a hardware description language such as RTL (Register Transfer Level) code, VeriLog™, VHDL, or SystemC.

Certain embodiments provide a switch mode power supply controller comprising means for implementing the above described method.

Certain embodiments provide a switch mode power supply controller employing a combination of pulse frequency modulation and pulse width modulation to control a power switching device, the controller having a plurality of operating power ranges each defining a range of average power transferred per switching cycle by said power switching device, each said range being defined by a combination of: one of a plurality of pre-determined pulse widths, and a range of durations of said switching cycle.

Certain embodiments provide a switch mode power supply controller employing a combination of pulse frequency modulation and pulse width modulation to control a power switching device, the controller having: an input to receive a power supply output dependent feedback signal; an output for driving said power switching device; and a digital controller to provide a switching control signal from said output responsive to said feedback signal from said input, said switching control signal having a switching cycle including an ON portion for switching on said power switching device, wherein said ON portion of said switching cycle is followed by a OFF portion for switching off said power device, wherein said controller is configured to end said OFF portion of said switching cycle and restart said ON portion of said switching cycle responsive to said feedback signal; and wherein said feedback signal comprises a variable level signal, and wherein said controller is configured to compare said feedback signal level with a reference level to determine a timing of said switching cycle restart.

Certain embodiments provide a switch mode power supply controller employing a combination of pulse frequency modulation and pulse width modulation to control a power switching device, the controller having: an input to receive an output voltage dependent feedback signal; an output for driving said power switching device; and a digital controller to provide a switching control signal from said output responsive to said feedback signal from said input; and wherein said controller is configured to vary said pulse frequency and pulse width in combination to maintain said pulse frequency at greater than an audio frequency when said pulse width is greater than a minimum pulse width.

Certain embodiments provide a switch mode power supply controller employing combination of pulse frequency modulation and pulse width modulation to control a power switching device, the controller having: an input to receive a power supply output dependent feedback signal; an output for driving said power switching device; and a digital controller to provide a switching control signal from said output responsive to said feedback signal from said input; and wherein said controller comprises: a system counter coupled to said input;

an output pulse generator couples to said an output of system counter and to said output; a pulse width look-up table having an output coupled to a pulse width control input of said output pulse generator; and a pulse width controller coupled to said system counter output and to said pulse width look-up table to select a pulse width for said pulse generator using said look-up table.

Certain embodiments provide a pulse width and frequency modulation (PWFM) SMPS (switch mode power supply) controller configured to control a drive signal to a power switching device of said SMPS by PWFM in response to a feedback signal responsive to an output condition of said SMPS, wherein said controller has a variable gearing ratio, said gearing ratio determining a range of available pulse widths for said PWFM, associated with a frequency of said PWFM, determining an operating power range for said SMPS.

In preferred embodiments the controller is configured to control the gearing ratio such that as the frequency is reduced the gearing ratio adjusts to select a range of available pulse widths determining a reduced operating power range for the switch mode power supply, and vice-versa. In some preferred embodiments the controller is configured to control the frequency responsive to the feedback signal using a pulse width selected from the range of available pulse widths set by the gearing ratio. The output condition to which the feedback signal responds may comprise an output current of the power supply, an output voltage of the power supply, or an output load of the power supply.

In embodiments the variable gearing ratio comprises a plurality of substantially fixed gearing ratios; in other embodiments the gearing ratio comprises a substantially continuously variable gearing ratio. In some preferred embodiments a range of available pulse widths determined by the gearing ratio is further determined by at least one stored pulse width.

Certain embodiments provide a switch mode power supply including a controller as described above.

BRIEF DESCRIPTION OF THE DRAWINGS

These and other aspects of the invention will now be further described, by way of example only, with reference to the accompanying figures in which.

DETAILED DESCRIPTION OF THE PREFERRED EMBODIMENT

Here we describe improved techniques for controllers employing a combination of pulse frequency modulation (PFM) and pulse width modulation (PWM). Broadly speaking we will describe techniques in which the switching frequency is maintained in the region of an efficient point of operation by employing a "gear box" control scheme using two complementary control loops. A first loop provides real-time control of the SMPS using PFM and a second loop operates a PWM control scheme which monitors the switching frequency and, at defined operating points, adjusts the pulse width up or down through a set of pre-determined values. This can be considered analogous to the gearbox of a motor vehicle with the SMPS pulse width, switching frequency and output power roughly corresponding to the vehicle's gear ratio, engine speed and road speed respectively. Embodiments of such a system also facilitate audio noise reduction since, in general the switching frequency can be managed to avoid human audible frequencies which can otherwise sometimes be generated through magnetostrickton and other electro mechanical vibrations. Embodiments of the system we describe also exhibit a good transient response and can operate over a wide range of input conditions, output mode conditions and power requirements.

A preferred embodiment of the invention is referred to by the applicant's as "Floyd Brane".

Figure 1:
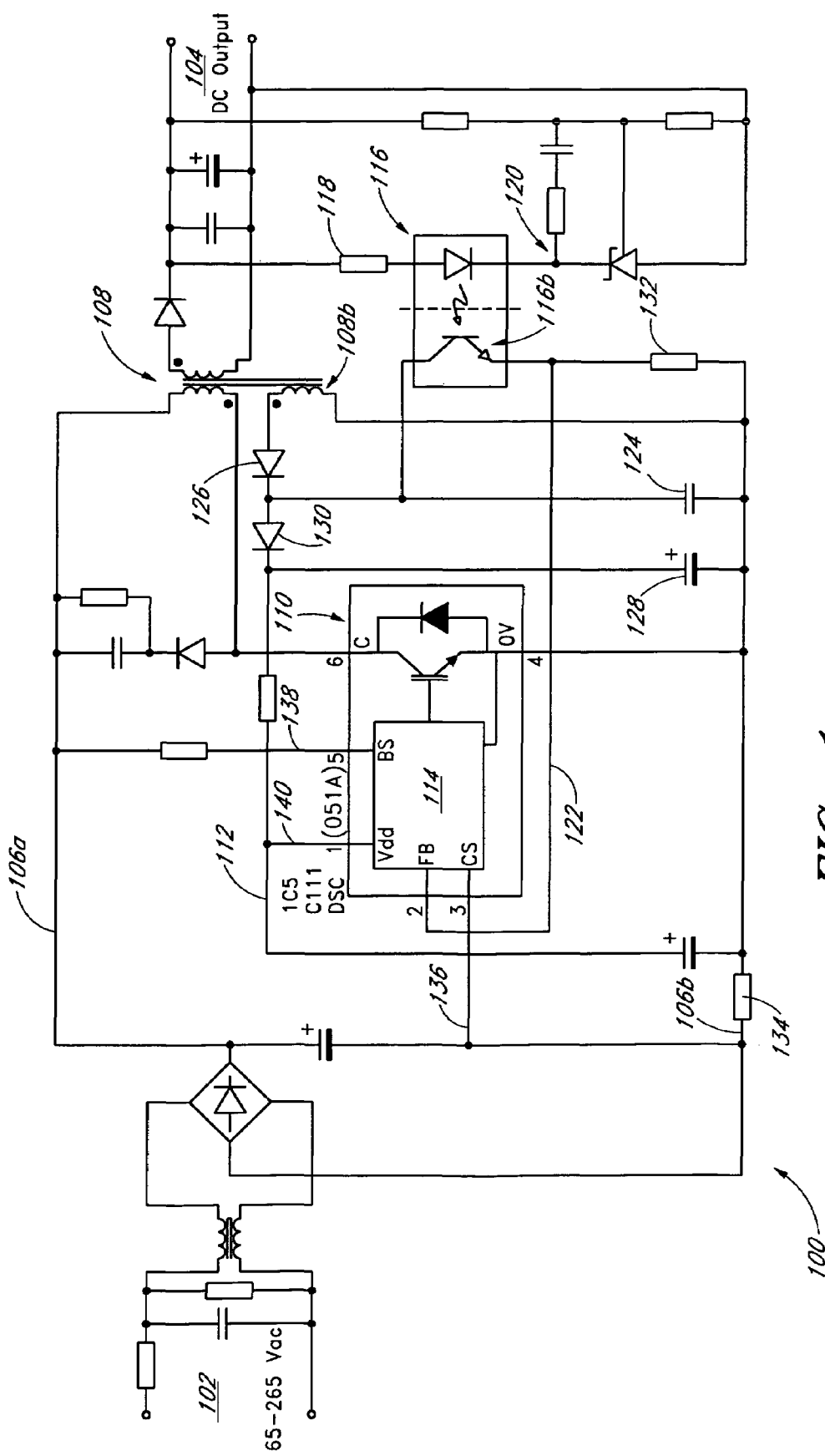
FIG. 1 shows an example of a switch mode power supply incorporating a controlling according to an embodiment of the present invention.

Referring to FIG. 1, this shows an example switch mode power supply circuit 100 having a domestic grid mains power supply input 102 and a DC output 104. The mains input 102 is rectified to provide DC power for lines 106a, b which supply power to an energy transfer device, in this example transformer 108 via a switching device, in this example power IGBT (Insulated Gate Bipolar Transistor) 110 (here shown as part of a power supply controller integrated circuit.

An auxiliary winding 108b provides DC power on line 112 for powering SMPS controller 114, which provides a drive signal to IGBT 110 to switch the device on and off. When the switching device is on energy is stored in the magnetic field of transformer 108, and when the switch turns off this energy is transferred to the secondary side of the transformer, where it is rectified and smoothed to provide DC output 104.

In the illustrated example secondary side feedback is provided by an opto-isolator 116 driven by the DC output voltage via a resistor 118 to a reference voltage circuit 120. Transistor 116b of opto-isolator 116 provides a feedback signal on line 122 to a feedback input (FB) on controller 114. The SMPS operates in a discontinuous conduction mode in which, as explained further later, when the switching device is turned off the output voltage after a steady period begins to decline (at which point the transformer begins to ring, entering a so-called oscillatory phase). In the circuit of FIG. 1, when the switching device is on capacitor 124 is charged via diode 126, and likewise capacitor 128 is charged via diode 130. In the oscillatory phase diodes 126 and 130 are off and charge is led from capacitor 124 by opto-isolator transistor 116b and pull-down resistor 132. The current through the opto-isolator is a function of whether the output voltage is at or below a target on the secondary side, this controlling the rate of descent of the voltage across capacitor 124. The voltage on feedback line 122 falls at substantially the same rate and thus the signal on line 122 is substantially proportional to the SMPS output voltage and, furthermore, responds on a power cycle-by-cycle basis.

A resistor 134 in DC supply line 106b acts as a current sense resistor (typically less than 1 ohm) to provide a current sense (CS) input into controller 114 on line 136 (inverted because line 136 is connected to the further end of resistor 134 from controller 114. This signal may be employed in a conventional manner to provide current limiting. Line 138 provides a bootstrap (BS) input to controller 114 which can be used to raise controller $V_{DD}$ rail 140 to its operating voltage level to achieve a rapid start-up.

Figure 2:
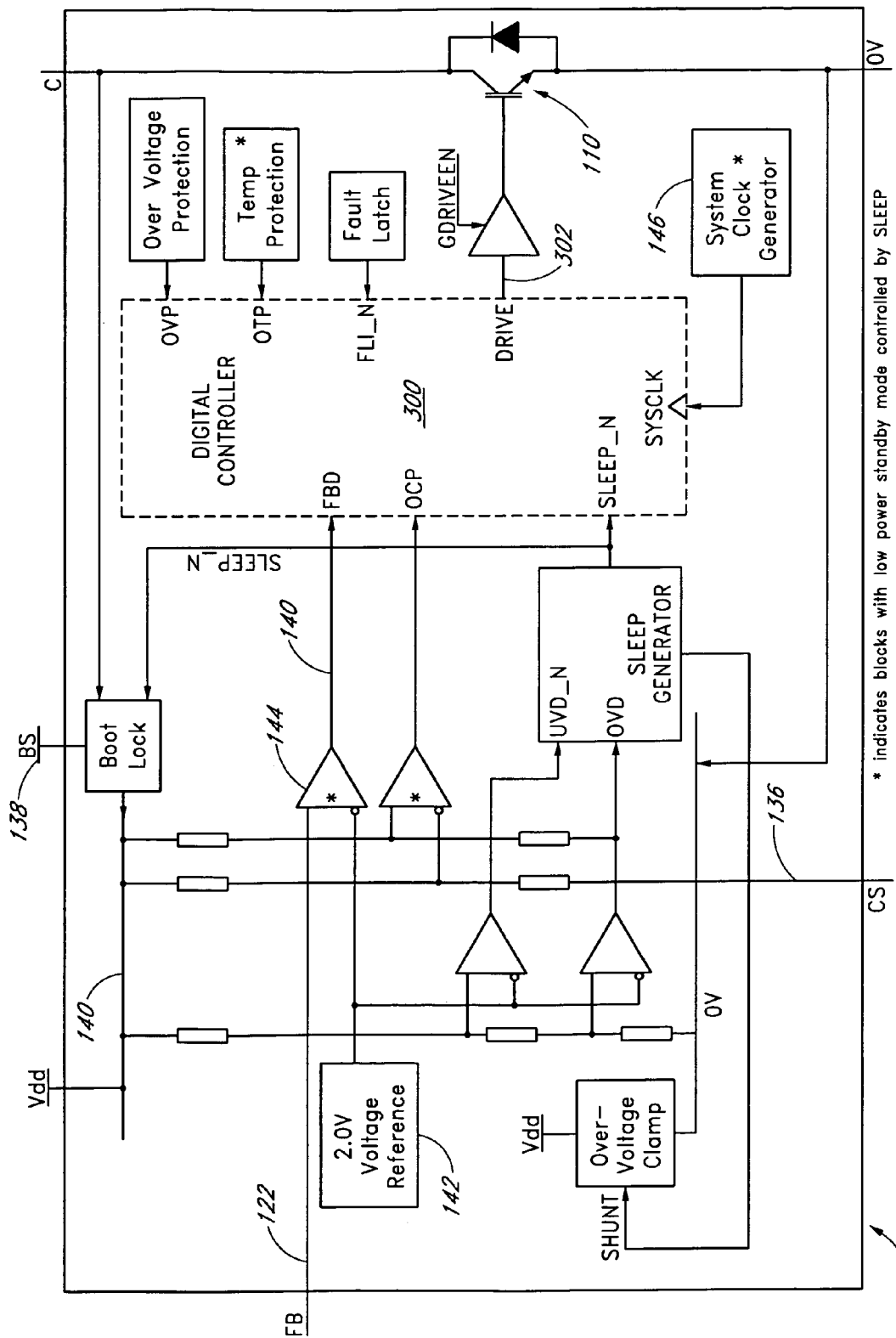
FIG. 2 shows a block diagram of a switch mode power supply controller.

Referring now to FIG. 2, this shows details of the controller 114 of FIG. 1. Controller 114 includes a digital pulse width/frequency control system 300 as described further below. The main feature of the block diagram of FIG. 2 in relation to control system 300 is the derivation of a digital feedback signal (FBD) 140 by comparing a voltage on feedback line 122 with a reference voltage, in the illustrated embodiment 2V, from a voltage reference 142, using a comparator 144. Other optional circuit blocks may be provided to implement over current protection (OCP), over voltage on $V_{DD}$ protection (OVD), under voltage on $V_{DD}$ protection (UVD), over voltage (on the high voltage side) protection (OVP), over temperature protection (OTP) a system fault latch (FLI) and a sleep control block to provide an optional stand-by mode of operation in which some circuit blocks (for example, those asterisked maybe powered down). A system clock 146 is preferably also included to provide a digital system clock for determining power cycle timings as described further later. In embodiments a system clock frequency in the range 1 MHz to 100 MHz, for example 16 MHz may be employed. Additionally or alternatively provision may be made for an external clock input.

Figure 3:
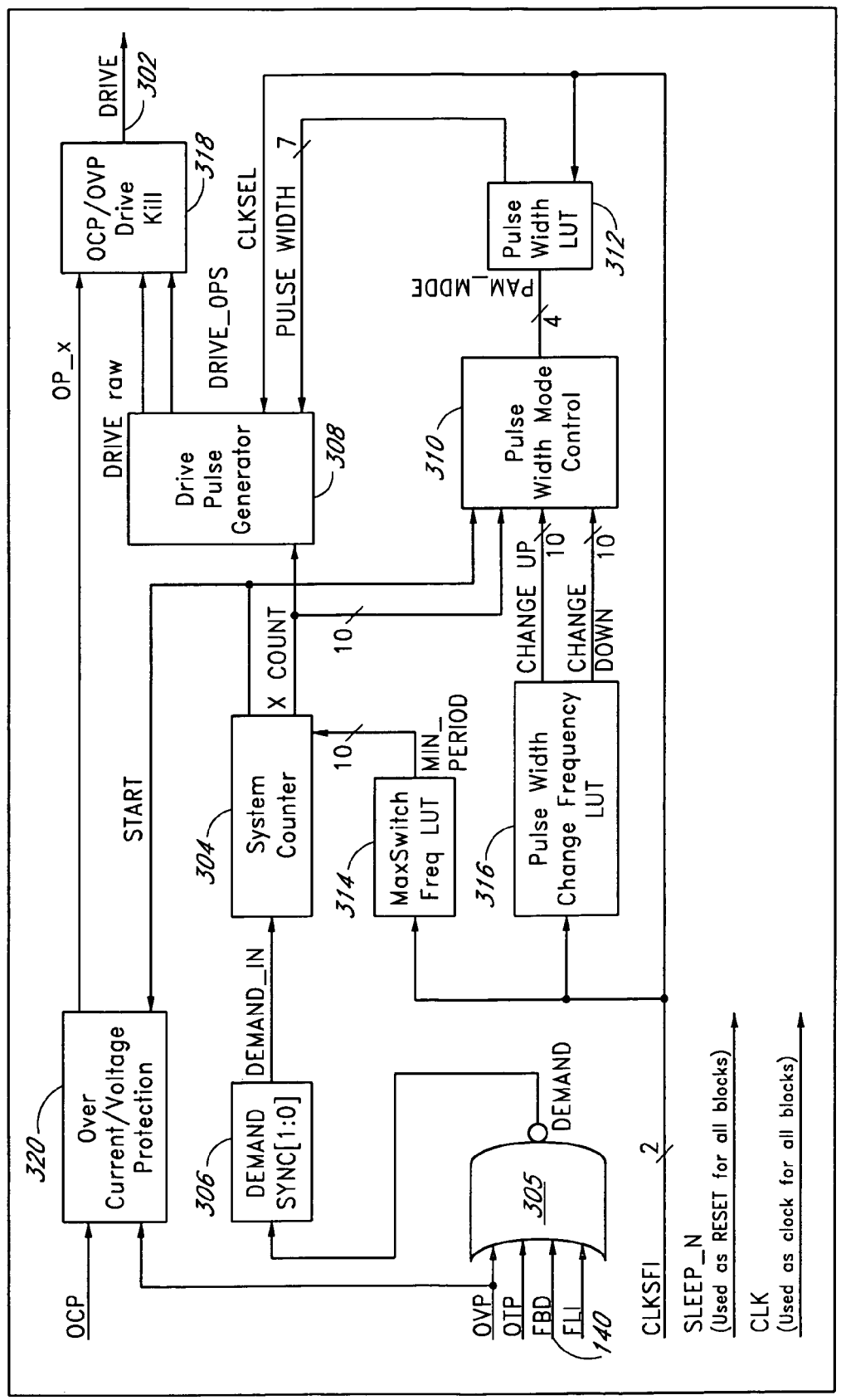
FIG. 3 shows a block diagram of a digital control system for the SMPS controller of FIG. 2.

Referring now to FIG. 3, this shows a detailed block diagram of the digital control system 300 of FIG. 2. Broadly speaking control system 300 provides a stream of drive pulses from output 302 for controlling the switching device (IGBT 110) to regulate the DC voltage at output 104 of the SMPS power supply of FIG. 1, using one of a set of fixed pulse width values (the "gear ratios") and an adjustable power cycle switching frequency.

We first describe the overall operation of the system.

Digital controller 300 implements a cycle by cycle power-on-demand scheme. Each power cycle has a minimum duration of n digital clock cycles, A power cycle has one of m fixed on-times (pulse widths) ranging from p to q (for example n/2) digital clock cycles and an off-time for a minimum of the reminder of the n cycles. The values of m, n, p, and optionally q are determined by the Power Switching Maximum Frequency Select inputs, CLKSEL[1:0].

Preferably controller 300 always uses an undivided internal digital clock, for example at 16 MHz, irrespective of the CLKSEL settings with CLKSEL determining the maximum power switching frequency, as shown in Table 1 below:

TABLE 1

CLKSEL Determines Maximum Switching Frequency Settings

| CLKSEL | CLK Frequency (MHz) | Max Switching Frequency |
| --- | --- | --- |
| 11 | 16 | 500 kHz |
| 10 | 16 | 250 kHz |
| 01 | 16 | 125 kHz |
| 00 | 16 | 62.5 kHz |

SMPS regulation by Pulse Frequency Modulation (PFM) is achieved by extending the off-time by an appropriate amount, determined by the system feedback. When one power cycle has completed, the off-time is extended until the FBD signal falls to zero indicating that the SMPS output voltage has fallen below its target value and that a new power cycle should commence. Optionally small cycle-to-cycle frequency modulation may be added to help spread RF emissions.

A second control loop monitors the actual switching frequency in order to maintain it at a frequency which will avoid the SMPS switching falling into the audio-noise band. If the switching frequency falls to $f_{CHANGE\_DOWN}$, the Pulse Width Mode (PWM) Control decrements the PWM_MODE value by 1. This selects the next smallest PULSE_WIDTH value from the Pulse Width Look-Up Table (LUT).

The PFM control loop compensates for the reduced pulse width by reducing the off-time between power cycles, which has the effect of increasing the switching frequency. As the power demand on the SMPS is reduced, this process continues, until the minimum pulse-width, q, is reached. With the minimum pulse width the switching frequency is adjusted as low as necessary to achieve SMPS regulation.

Conversely, if the switching frequency increases to $f_{CHANGE\_UP}$, the Pulse Width Mode Control increments the PWM_MODE value by 1. This selects the next biggest PULSE_WIDTH value from the Pulse Width Look-Up Table (LUT).

The PFM control loop compensates for the increased pulse width by increasing the off-time between power cycles, which has the effect of decreasing the switching frequency. As the power demand on the SMPS is increased, this process continues, until the maximum pulse-width, n/2, is reached. With the maximum pulse width the switching frequency is adjusted up to its maximum permitted value in order to achieve output regulation. The value of $f_{CHANGE\_UP}$ is chosen as follows: It should be high enough to ensure there is overlap between the power ranges that adjacent PULSE_WIDTH values can deliver, so that regulation does not require hunting between two different pulse widths; and it should be as low as practicable to aim to minimise switching losses and maximise efficiency.

The amount of power delivered in each power switching cycle is determined by a combination of the power device on-time (pulse width) and the switching frequency, which is determined by the spacing between power cycles. For any set of input voltage and load conditions, the controller determines an appropriate pulse width and adjust the switching frequency to maintain the SMPS output at the desired voltage. In practice, there will be a small measure of cycle to cycle frequency variation as the switching period must always be an integral multiple of the digital clock period.

There is preferably deliberate overlap between the range of power levels which the various pulse width values can deliver. This gives hysteresis, which prevents continual jumping between one pulse width value and the next.

An example PWM pulse width lookup table is given in Table 2 below:

TABLE 2

Pulse Width Look-Up Table

| | PULSE_WIDTH | | | |
|---|---|---|---|---|
| PWM_MODE | CLKSEL = 11<br>500 KHz Max Switch F | CLKSEL = 10<br>250 KHz Max Switch F | CLKSEL = 01<br>125 KHz Max Switch F | CLKSEL = 00<br>62.5 KHz Max Switch F |
| 15 | | | | |
| 14 | | | | |
| 13 | | | | 128 |
| 12 | | | | 115 |
| 11 | | | | 94 |
| 10 | | 32 | 64 | 72 |
| 9 | | 24 | 48 | 55 |
| 8 | 16 | 18 | 34 | 38 |
| 7 | 11 | 14 | 24 | 26 |
| 6 | 8 | 10 | 18 | 18 |
| 5 | 6 | 7 | 12 | 12 |
| 4 | 4 | 5 | 8 | 8 |
| 3 | 3 | 4 | 6 | 6 |
| 2 | 2 | 3 | 4 | 4 |
| 1 | 1.5 | 2 | 3 | 3 |
| 0 | 1 | 1 | 2 | 2 |

An example set of pulse width adjustment frequency thresholds is given in Table 3 below:

TABLE 3

Pulse Width Adjustment Frequency Thresholds

| | CLKSEL[1:0] | | | |
|---|---|---|---|---|
| | 11 | 10 | 01 | 00 |
| $f_{CHANGE\_UP}$ | 50 KHz | 50 KHz | 50 KHz | 50 KHz |
| $f_{CHANGE\_DOWN}$ | 20.82 KHz | 20.82 KHz | 20.82 KHz | 20.82 KHz |

Referring again to FIG. 3, the functional inputs and outputs are as follows:

Inputs:

| | |
|---|---|
| FBD | Feedback |
| OCP | Over Current Protection |
| OTP | Over Temperature Protection |
| OVP | Over Voltage Protection |
| FLI | Fault Latch Input |
| SLEEP_N | Reset (Active low) |
| CLK | System Clock |
| CLKSEL[1:0] | Power Switching Maximum Frequency Select |

Outputs:

| | |
|---|---|
| DRIVE | To IGBT gate driver circuit |

The FBD signal has already been described; the DRIVE signal provides a switching control signal to an IGBT gate driver circuit to switch the IGBT on and off (in other systems other power devices may be employed). The other signals are outlined below:

If SLEEP_N, the chip reset signal is active, the DRIVE signal is forced off asynchronously. DRIVE is driven high when the Main Counter starts incrementing. The DRIVE signal stays high until the counter reaches the on-time (pulse_width) specified by the Pulse Width Look-Up Table value. The counter continues until it reaches the minimum cycle time. It then continues incrementing until a new power switching cycle commences at the request of the DEMAND_int signal or its maximum value is reached.

OCP going to its active high state indicates that the integrated power device's (IGBT) current has exceeded the current limit. The DRIVE signal is deactivated immediately for the remainder of the current switching cycle, but is re-asserted as normal at the start of the next cycle. In order to ensure the fastest possible response this input is asynchronous.

OVP going to its active high state indicates that the reflected voltage has exceeded the voltage limit. The DRIVE signal is deactivated immediately for the remainder of the current switching cycle, but is re-asserted as normal at the start of the next cycle. In order to ensure the fastest possible response, this input is asynchronous.

Over temperature protection is controlled by the OTP signal, which gets set when an over-temperature condition is detected. At the end of the present power switching cycle, DEMAND_int is held at zero, thus preventing a new power switching cycle from commencing.

Preferably provision is made for the system designer to add additional fault detection circuits, such as one to monitor the PCB temperature. On detection of such an external fault, the system pulls the CS pin to >=3.0V, which will cause the fault latch to be set (CS normally operates in the region of 0V down to approx −500 mV). This activates the FLI_N signal, which prevents the digital controller from commencing a new power switching cycle. The fault latch can be reset by power cycling the chip.

We next describe each of the functional blocks in FIG. 3 in turn:

System Counter 304:

This comprises a simple binary up counter which increments on positive edges of system clock, zeroed at start of each switching cycle.

In preferred embodiments it comprises a 10-bit counter, whose output, X_COUNT, is used by other blocks to determine the correct timing of their operations. The counter is used in two ways: It is used to time the operation of the power switching cycle, which has a pre-determined on-time (pulse width) and an off-time completing a total of n digital clock cycles. It then continues counting until the start of the next power switching cycle. PFM control is provided by permitting the counter to be reset to zero when the DEMAND_int signal indicates that a new power switching cycle should commence. The START signal indicates the start of a new power switching cycle. In preferred embodiments the counter is not allowed to roll-over.

Just prior to the start of a new power switching cycle, X_COUNT indicates the value of the period between adjacent switching cycles. From this information, Pulse Width Mode Control block 310 is able to determine the actual switching frequency and determine whether an adjustment should be made to the pulse width.

Demand OR Gate 305:

This comprises a simple OR gate which generates an output DEMAND=OTP|OVP|FLI|I|FBD.

DEMAND SYNC[1:0] Block 306:

This generates a re-clocked output, DEMAND_INT=DEMAND. Hence in preferred embodiments this block takes the inverted logical OR of the asynchronous OVP, OTP, FLI and FBD inputs and synchronises it to the controller's internal (system) clock domain through two flip-flops. Its output, DEMAND_int, is used by the main counter to instigate the start of a new power switching cycle.

Drive Pulse Generator 308:

This generates and outputs DRIVE and DRIVE_OP5 signals, which are pulses with length defined by inputs PULSE_WIDTH and X_COUNT. DRIVE is clocked on positive edges of the system clock, DRIVE_OP5 is clocked on negative edges.

In preferred embodiments this comprises a latch based block, which provides a 'raw' gate drive pulse of the required width. Its output, DRIVE_raw, is set active as X_COUNT is cleared to '0'. It then remains high for the pulse-width duration specified by the appropriate value in Pulse Width Look-Up Table 312. In order to provide very fine control of the pulse width, a version of DRIVE_raw delayed by ½ a clock cycle is preferably generated when a non-integer PULSE_WIDTH value is required. This is logically ORd with the regular DRIVE_raw to give a pulse width accurate to the nearest ½ digital clock cycle.

Pulse Width Mode Control 310:

This generates an output value PWM_MODE (equivalent to the gear selector) from X_COUNT<CHANGE_UP (change up to a larger pulse width) and X_COUNT>CHANGE_DOWN (change down to a smaller pulse width).

In preferred embodiments this comprises a 4-bit up/down counter with over/underflow protection. The value of the counter, PWM_WIDTH_M1, is sent to the Pulse Width Look-Up Table 312, where it is used to select the appropriate pulse width. Unless it is at its maximum permitted value, PWM_MODE is incremented when the value of X_COUNT indicates that the switching frequency has exceeded the limit $f_{CHANGE\_up}$. Conversely, unless it is at its minimum value, PWM_MODE is decremented when the value of X_COUNT indicates that the switching frequency has fallen below the limit $f_{CHANGE\_DOWN}$. PWM_MODE is adjusted only when the START signal indicates the start of a new switching cycle. In embodiments the maximum permitted value is determined by the CLKSEL value.

Pulse Width Look-Up Table (LUT) 312:

This generates an output value PULSE_WIDTH (akin to a "gearbox ratio") from PWM_MODE and CLKSEL.

In preferred embodiments this block translates the 4-bit PWM_MODE value, in conjunction with the clock divide selector, CLKSEL, into a pulse width (or on-time) value, for example as indicated in Table 2 above. Providing table entries selectable according to maximum switching speed facilitates good output regulation and helps reduce audio noise. The 7-bit output, PULSE_WIDTH, is supplied to the Drive Pulse Generator 308.

Maximum Switching Frequency Look-Up Table 314:

This provides a (10-bit) minimum switching period value output, MIN_PERIOD, which may be determined (referenced in the lookup table) by the CLKSEL value. In other embodiments different architectures may be employed to provide MIN_PERIOD.

Pulse Width Change Frequency Look-Up Table 316:

This provides (10-bit) switching cycle period values CHANGE_UP and CHANGE_DOWN, which correspond to the above mentioned $f_{CHANGE\_up}$ and $f_{CHANGE\_DOWN}$ frequencies respectively. The architecture described here (a look-up table referenced by CLKSERE) permits these values to be determined by the CLKSEL value, although in the example of Table 3 above the same values are used for all four CLKSEL values. In other embodiments different architectures may be employed.

OCP/OVP Drive Kill Block 318:

This generates an output DRIVE=!OP_x & (DRIVE_RAW & DRIVE_OP5). In preferred embodiments this comprises asynchronous boolean logic which takes in the gate drive signal, DRIVE_raw, and modulates it with the latched OP_x error signal. Thus in embodiments its output, DRIVE, is substantially identical to DRIVE_raw unless there is an error condition, in which case it may be forced to zero for the remainder of the (present) switching cycle.

OverCurrent/Voltage Protection Block 320:

This generates an output OP_x=OVP |OCP. In preferred embodiments an asynchronous latch-based block producing output OP_x, which goes active whenever an Over Current or Over Voltage condition occurs. The OP_x signal is preferably cleared at the start of the next power switching cycle.

Figure 4:
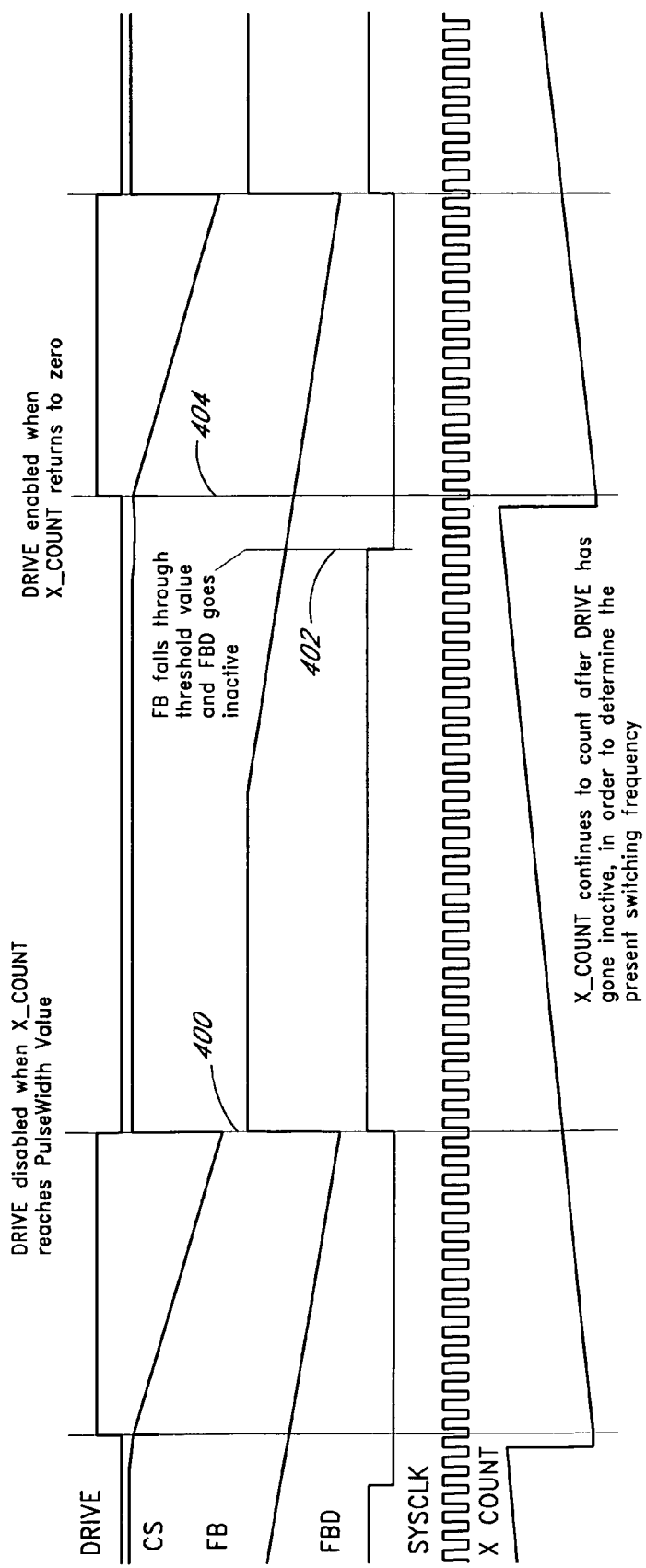
FIG. 4 shows a timing diagram of pulse width and frequency control for the controller of FIGS. 2 and 3.

We now further describe the operation of the digital control system 300 with reference to the timing diagram of FIG. 4.

The feedback input, FB, is connected in a configuration, such as that shown in FIG. 1, in which cycle by cycle data on the state of the SMPS output is provided. FIG. 4 shows the relationship between the key signals in this control scheme.

As previously described, when the power device 110 is turned off, the fly-back action raises FB line 122 (for example via transformer 108, diode, capacitor and opto-coupler 116) up to a constant voltage. This voltage is then held until the fly-back oscillatory phase, when it begins to decline. The rate of discharge is governed by the opto-coupler 116, which is itself controlled by an analog integral of the output voltage error. Analog comparator 144 compares the voltage of FB with a voltage from fixed reference 142 to provide output 140, FBD, to the digital control module 300. Shortly after FBD goes to zero, a new power switching cycle will commence.

FIG. 4 shows the relationship between the DRIVE, CS, FB, FBD, SYSCLK (the system clock) and X_COUNT signals described above. At edge 400 DRIVE is disabled (switched off) when X_COUNT reaches the PulseWidth value (from LUT 312), and FBD transitions to 1 (becomes active). Some time after FB begins to decline the threshold (voltage reference) level is reached, at which point FBD transitions to 0 (becomes inactive), defining edge 402. Edge 404 corresponds to edge 402 but is delayed by DEMAND_SYNC[1:0]block 306. At edge 404 X_COUNT is reset to zero (this continues to count after DRIVE goes inactive, i.e. Off, to determine the duration of the present cycle, i.e. the present cycle's switching frequency).

As previously described digital control system 300 implements a cycle by cycle power-on-demand scheme. Each power cycle has a minimum duration of n digital clock cycles, which determines the maximum possible switching frequency. A power cycle has one of m fixed on-times (pulse widths, DRIVE active) ranging from p to q digital clock cycles and an off-time for a minimum of the remainder of the n cycles. The values of m, n, p and q may'be chosen, for example by routine experiment, to give the best performance for a given application.

Figure 5:
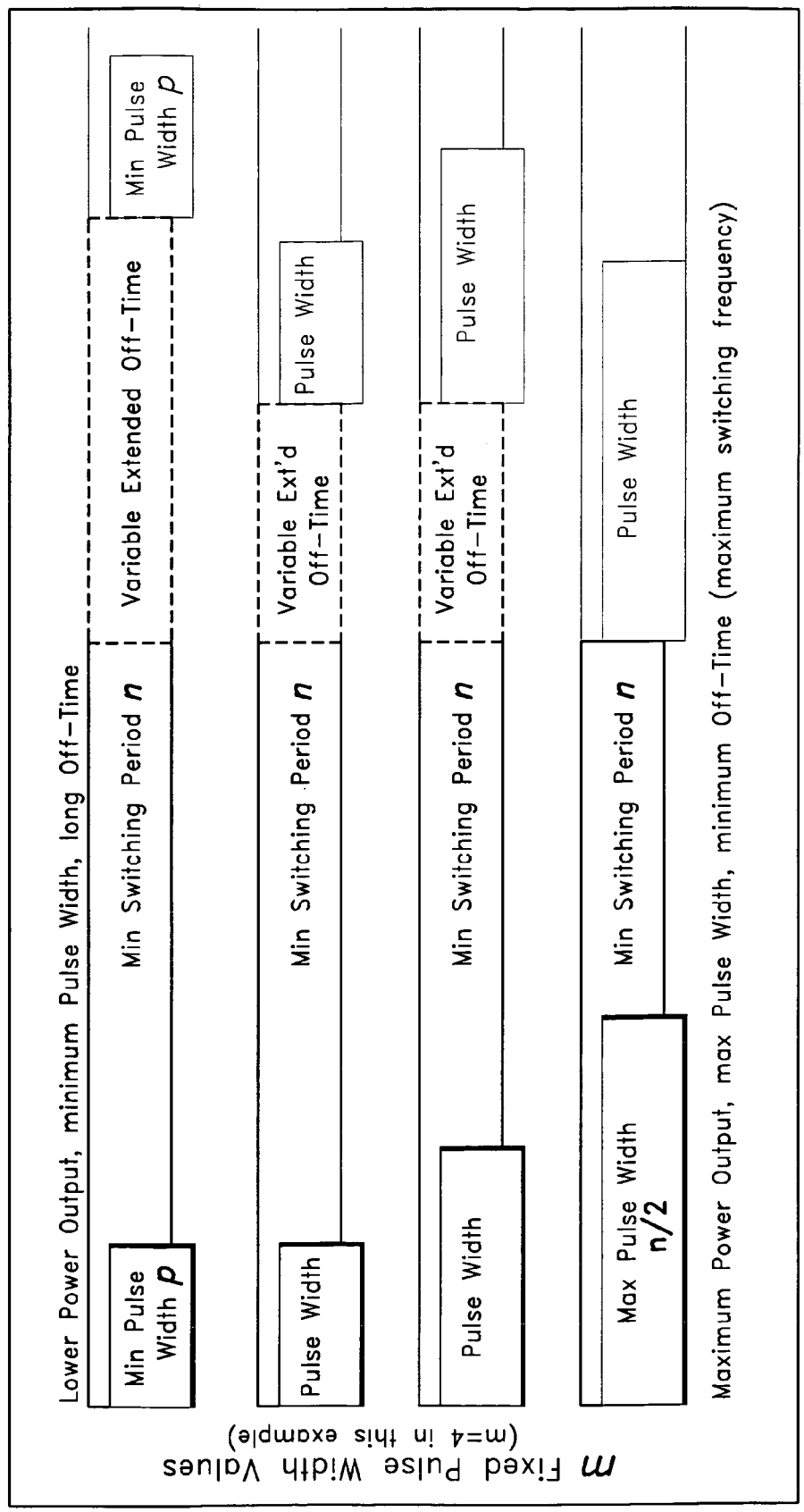
FIG. 5 shows example pulse widths and switching cycle durations for a plurality of operating power ranges of the controller of FIGS. 2 and 3.

FIG. 5 illustrates operation of an embodiment of the control system in which m=4, so that the control algorithm can vary the pulse width across 4 fixed value Pulse Widths. For low load conditions, the shortest pulse width of value p is selected. The system regulates the SMPS by choosing an appropriate Off-time and hence switching frequency. For medium loads, one of the intermediate Pulse Width values is selected and the Off-Time is adjusted to regulate the SMPS accordingly. If the switching frequency is too high or too low, a different Pulse Width value will be chosen. At maximum load, the maximum pulse width q is chosen (n/2 in this example, which gives a 50% duty-cycle). In this case the extended Off-Time is reduced to zero and the SMPS switches at its maximum frequency, with period n.

In order to address a number of differing target applications, the architecture preferably allows several sets of m, n, p and q parameters to be implemented in a single circuit. The appropriate set of parameters may, for example, be set by input pads, programming of fuses or internal hardwiring. Example sets of these values are given in Table 4 below:

| CLKSEL | m | n | p | q |
|--------|---|---|---|---|
| 00 | 13 | 31 | 1 | 15 |
| 01 | 10 | 63 | 1 | 31 |
| 10 | 10 | 127 | 1 | 63 |
| 11 | 8 | 255 | 1 | 127 |

As the above example shows, SMPS regulation by Pulse Frequency Modulation (PFM) is achieved by extending the off-time by an amount determined by the system feedback. When one power cycle has completed the off-time is extended until the FBC signal falls to zero indicating that the SMPS output voltage has fallen below its target value and that a new power cycle should commence.

A second control loop monitors the actual switching frequency in order to maintain it at a frequency which aims to avoid the SMPS switching falling into the audio-noise band. Preferably, if the switching frequency falls towards the region where audio noise could be generated, then a shorter on-time is selected.

The PFM control loop compensates for the reduced pulse width by reducing the off-time between power cycles, which has the effect of increasing the switching frequency, As the power demand on the SMPS is reduced, this process continues until the minimum pulse-width, p, is reached. With the minimum pulse width the switching frequency is preferably adjusted as low as necessary to achieve SMPS regulation. Conversely, if the switching frequency increases to a value, where the SMPS is not working as efficiently as practicable, then a longer on-time may be selected.

The PFM control loop compensates for the increased pulse width by increasing the off-time between power cycles, which has the effect of decreasing the switching frequency. As the power demand on the SMPS is increased, this process continues until the maximum pulse-width, q, is reached. With the maximum pulse width, the switching frequency is increased as required (up to its maximum permitted limit) to achieve output regulation.

The (average) amount of power delivered in each power switching cycle is determined by a combination of the power device on-time (pulse width) and the switching frequency, which is determined by the spacing between power cycles. For a particular set of input voltage and load conditions, the controller will determine an appropriate pulse width and adjust the witching frequency to maintain the SMPS output at the desired voltage. Short term regulation thus adjusts the switching cycle frequency by adjusting the off-time, and longer term regulation adjusts the pulse width.

Figure 6:
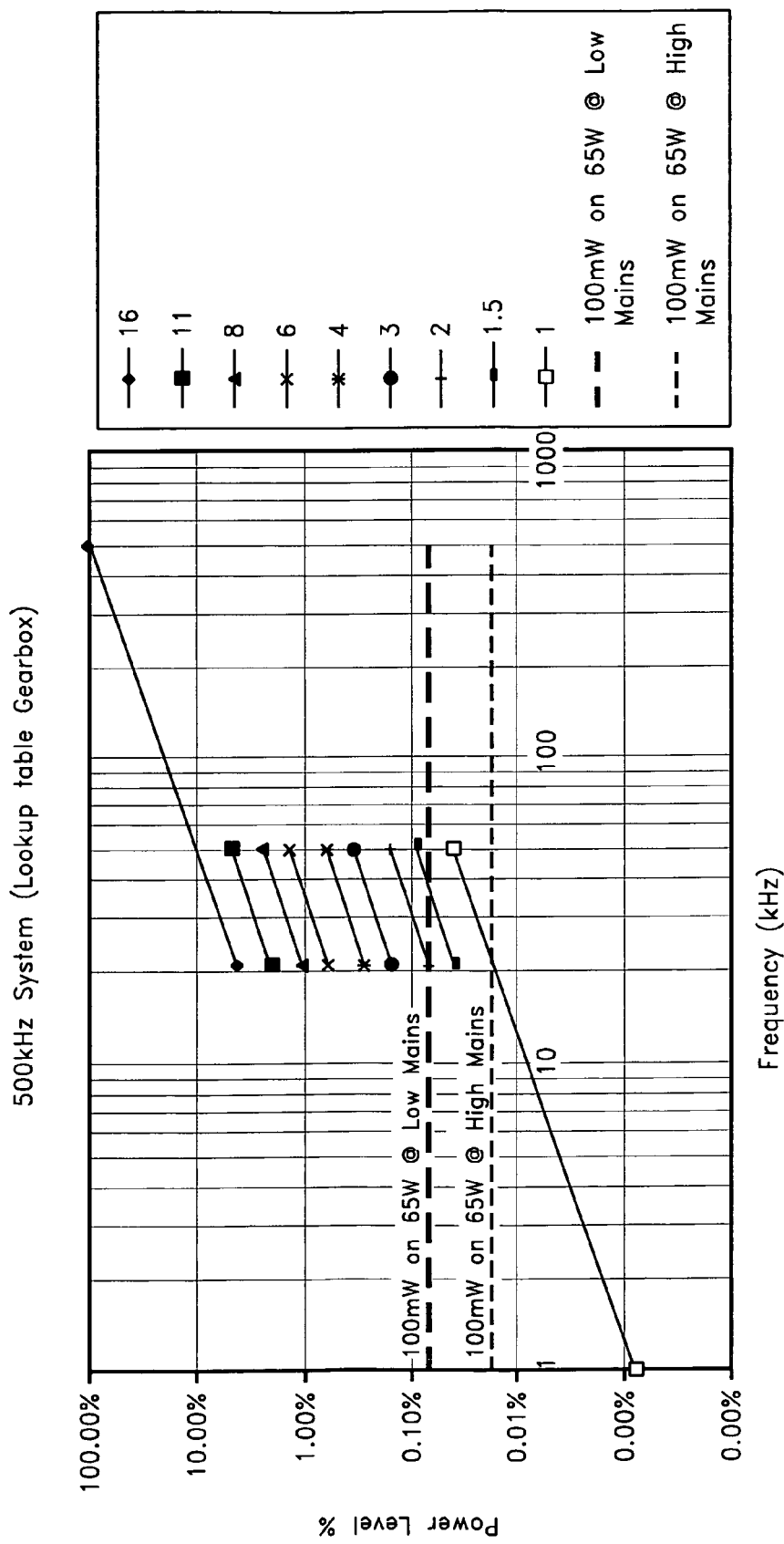
FIG. 6 shows a set of power level curves for the controllers of FIGS. 2 and 3.

FIG. 6 shows a graph with lines of output power level as a percentage of a maximum against power switching cycle frequency. The graph illustrates the 'power strata' concept, showing the power and switching frequency range for an implementation with nine pulse width value when CLKSEL selects the maximum switching frequency (for this example embodiment) of 500 KHz.

In the example of FIG. 6 the controller maintains the switching frequency between 20 kHz (the generally accepted human audio threshold) and 40 KHz. The latter figure keep the switching speed low whilst still providing a useful level of hysteresis between the Pulse-Width values. This inhibits short term regulation from being achieved by Pulse Width Modulation.

We have described an SMPS control scheme which, in embodiments, achieves stable output voltage control, a timely transient response and excellent audio noise suppression across a wide variety of input conditions, output load conditions and power requirements. In particular the control scheme uses a PWM 'gear box' to enhance the efficiency and suppress audio-noise, extending the off-time as required to achieve regulation. Embodiments of the SMPS feedback system provide a real time cycle by cycle feedback response. Embodiments of the controller can thus operate in a 'power on demand' mode of operation, with substantially evenly spaced pulses.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A switch mode power supply controller employing a combination of pulse frequency modulation and pulse width modulation to control a power switching device, the controller having:

an input to receive an output voltage dependent feedback signal;

an output for driving said power switching device; and a control system to provide a switching control signal to said output responsive to said feedback signal from said input, said switching control signal having a switching cycle including an ON portion for switching on said power switching device, and wherein said control system is configured to select one of a plurality of discrete pulse widths for said ON portion of said switching cycle using at least one stored pulse width, and to vary a duration of said switching cycle responsive to said feedback signal; and wherein the control system is configured to determine said switching cycle duration and to select one of said at least one stored pulse width responsive to said determined duration; and wherein said control system has a plurality of operating power ranges each defining a range of average power transferred per switching cycle by said power switching device, each said range being defined by a combination of one of said at least one stored pulse width and a range of durations of said switching cycle, adjacent ones of said operating power ranges overlapping across a range of power levels.

2. A switch mode power supply controller as claimed in claim 1 wherein said control system is configured to select one of a plurality of stored pulse widths for said ON portion of said switching cycle.

3. A switch mode power supply controller as claimed in claim 1 wherein said at least one stored pulse width comprises a maximum pulse width and a minimum pulse width, and wherein said control system is configured to select a said discrete pulse width between said stored maximum and minimum pulse widths.

4. A switch mode power supply controller as claimed in claim 1 wherein said ON portion of said switching cycle is followed by a OFF portion for switching off said power device, and wherein said control system is configured to end said OFF portion of said switching cycle and restart said ON portion of said switching cycle responsive to said feedback signal.

5. A switch mode power supply controller as claimed in claim 4 wherein said feedback signal comprises a variable level signal, and wherein said control system is configured to compare said feedback signal level with a reference level to determine a timing of said switching cycle restart.

6. A switch mode power supply controller as claimed in claim 1 wherein said control system is configured to select an increased said pulse width responsive to said determined duration being less than a lower threshold and a decreased pulse width responsive to said determined duration being greater than an upper threshold.

7. A switch mode power supply controller as claimed in claim 6 wherein said upper threshold duration defines a switching cycle frequency of greater than 20 KHz.

8. A switch mode power supply controller as claimed in claim 1 further comprising a data store to store values of one or more of n, m, p and q where n defines a minimum duration of a said switching cycle, m defines a number of said stored pulse widths for selection, p defines a minimum duration of a said pulse width, and q defines a minimum duration of a said pulse width.

9. A switch mode power supply controller as claimed in claim 1 further comprising a look-up table storing said one or more pulse widths.

10. A switch mode power supply controller as claimed in claim 1 wherein said pulse widths are stored, embodied as hardware for a set of pulse generators, to generate pulses having said pulse widths.

11. A switch mode power supply including the switch mode power supply controller in claim 1.

12. A method of operating a switch mode power supply controller employing a combination of pulse frequency modulation and pulse width modulation to control a power switching device, the controller having:

an input to receive an output voltage dependent feedback signal;

an output for driving said power switching device; and a control system to provide a switching control signal to said output responsive to said feedback signal from said input, said switching control signal having a switching cycle including an ON portion for switching on said power switching device; and wherein said control system has a plurality of operating power ranges each defining a range of average power transferred per switching cycle by said power switching device, each said range being defined by a combination of one of at least one stored pulse width and a range of durations of said switching cycle, adjacent ones of said operating power ranges overlapping across a range of power levels, the method comprising:

selecting one of a plurality of discrete pulse widths for said ON portion of said switching cycle using at least one stored pulse width;

varying a duration of said switching cycle responsive to said feedback signal to regulate an output of said switch mode power supply;

determining said switching cycle duration; and selecting a next highest or next lowest one of said at least one stored pulse width responsive to said determining when the power switching device is operating at a power level within the corresponding overlapping range of power levels.

13. A method as claimed in claim 12 wherein said selecting one of a plurality of discrete pulse widths comprises selecting one of a plurality of stored pulse widths for said ON portion of said switching cycle.

14. A method as claimed in claim 12 wherein said at least one stored pulse width comprises a maximum pulse width and a minimum pulse width, and wherein said selecting one of a plurality of discrete pulse widths comprises selecting a said discrete pulse width between said stored maximum and minimum pulse widths.

15. A carrier medium carrying processor control code to implement the method of claim 12.

16. A switch mode power supply controller employing a combination of pulse frequency modulation and pulse width modulation to control a power switching device, the controller having a plurality of operating power ranges each defining a range of average power transferred per switching cycle by said power switching device, each said range being defined by a combination of: one of a plurality of pre-determined pulse widths, and a range of durations of said switching cycle, wherein adjacent ones of said operating power ranges overlap across a range of power levels to provide hysteresis.

17. A pulse width and frequency modulation (PWFM) SMPS (switch mode power supply) controller configured to control a drive signal to a power switching device of said SMPS by PWFM in response to a feedback signal responsive to an output condition of said SMPS, wherein said controller has a variable gearing ratio, said gearing ratio determining a range of available pulse widths for said PWFM, associated with a frequency of said PWFM, determining an operating power range for said SMPS, and wherein adjacent ones of said available pulse widths determined by said variable gearing ratio are able to deliver an overlapping range of power levels.

18. A PWFM SMPS controller as claimed in claim 17 configured to control said gearing ratio such that as said frequency is reduced said gearing ratio adjusts to select a said range of available pulse widths determining a reduced operating power range for said SMPS and vice-versa.

19. A PWFM SMPS controller as claimed in claim 17 configured to control said frequency responsive to said feedback signal using a pulse width selected from said range of available pulse widths.

20. A PWFM SMPS as claimed in claim 17 wherein said output condition comprises a condition selected from the group comprising an output current of said SMPS, an output voltage of said SMPS and an output load of said SMPS.

21. A PWFM SMPS controller as claimed in claim 17 wherein said variable gearing ratio comprises a plurality of substantially fixed said gearing ratios.

22. A PWFM SMPS controller as claimed in claim 17 wherein said variable gearing ratio comprises a substantially continuously variable said gearing ratio.

23. A PWFM SMPS controller as claimed in claim 17 wherein a said range of available pulse widths is determined by at least one stored pulse width.

* * * * *